(12) United States Patent
Chuan et al.

(10) Patent No.: US 8,664,913 B2
(45) Date of Patent: Mar. 4, 2014

(54) BATTERY POWERED APPARATUS WITH THE CIRCUIT OF INTEGRATED POWER MANAGEMENT AND CHARGER UNIT

(75) Inventors: Chia-So Chuan, Hsinchu (TW); Jui-Liang Wang, Zhubei (TW)

(73) Assignee: ISSC Technologies Corp., Hsinchu (TW)

( * ) Notice: Subject to any disclaimer, the term of this patent is extended or adjusted under 35 U.S.C. 154(b) by 372 days.

(21) Appl. No.: 13/269,649

(22) Filed: Oct. 10, 2011

(65) Prior Publication Data

US 2013/0088187 A1    Apr. 11, 2013

(30) Foreign Application Priority Data

Aug. 10, 2011    (TW) .............................. 100128521 A

(51) Int. Cl.
*H02J 7/00* (2006.01)
(52) U.S. Cl.
CPC .............. *H02J 7/0068* (2013.01); *H02J 7/007* (2013.01); *H02J 7/0073* (2013.01); *H02J 7/0004* (2013.01)
USPC ............................ 320/107; 320/128; 320/137
(58) Field of Classification Search
CPC ....... H02J 7/0068; H02J 7/007; H02J 7/0073; H02J 7/0004
USPC ......................................... 320/107, 128, 137
See application file for complete search history.

(56) References Cited

U.S. PATENT DOCUMENTS

| | | | |
|---|---|---|---|
| 4,851,818 A * | 7/1989 | Brown et al. ................. | 340/603 |
| 5,534,765 A | 7/1996 | Kreisinger et al. | |
| 6,608,464 B1 * | 8/2003 | Lew et al. ..................... | 320/107 |
| 6,861,824 B1 * | 3/2005 | Liu et al. ....................... | 320/164 |
| 7,002,265 B2 * | 2/2006 | Potega ........................... | 307/149 |
| 7,615,965 B2 * | 11/2009 | Popescu-Stanesti et al. . | 320/128 |
| 7,684,833 B2 * | 3/2010 | Marschalkowski et al. .. | 455/574 |
| 2011/0074360 A1 * | 3/2011 | Kerr et al. ..................... | 320/137 |
| 2011/0260556 A1 * | 10/2011 | Partridge et al. .............. | 307/150 |
| 2012/0159220 A1 * | 6/2012 | Winkler et al. ............... | 713/323 |

* cited by examiner

*Primary Examiner* — M'Baye Diao
(74) *Attorney, Agent, or Firm* — Ming Chow; Sinorica, LLC

(57) ABSTRACT

The present invention discloses a battery powered apparatus with the circuit of integrated power management and charger unit. It mainly comprises a power management and charger unit, a battery powered device, a battery and an adaptor. By integrating the charger unit, the power switch and the programmable current source to the micro-processor, the micro-processor can properly control the power supplied from the adaptor to the battery under the charging mode operation, which further derives a smoother curve of charging current.

9 Claims, 9 Drawing Sheets

BATTERY POWERED APPARATUS WITH THE CIRCUIT OF INTEGRATED POWER MANAGEMENT AND CHARGER UNIT

BACKGROUND OF THE INVENTION

1. Field of the Invention

The present invention relates generally to a power management and charger circuitry, and more particularly, to a circuit of integrated power management and charger unit applied to the battery powered apparatus.

2. Background

For any battery-powered devices, it typically requires a separate charger for connection to an adaptor during battery recharge. An adaptor provides alternate current (AC) to direct current (DC) conversion. In order to properly charge the battery, a charger is typically used.

U.S. Pat. No. 5,534,765, issued to Naokawa et al. entitled "Battery with memory for storing charge procedure" discloses a charger for supplying charge current and voltage and a battery having a memory for storing charge parameters, where the block diagram of an example design for a power management and charge unit is shown in FIG. 1. At the highest functional level, it includes a charger unit 110, a battery 120 and a battery-powered device. The charger unit further includes a micro-processor, Read Only Memories (ROM), Random Access Memories (RAM), and programmable current and voltage sources. Various charging configurations (for various charging current) are stored in the RAM/ROM. While the device is being charged, the input of the charger unit 110 is connected to an adaptor. The output of the charger unit 110 is connected to the input of the battery. In this design, the characteristics of the battery 120 are stored in the memory 122 of the battery 120. While charging, the characteristic of the battery 120 is first read (by the controller 130) from the battery memory 122. And based on the battery characteristics, proper charging current is supplied (by the charger unit 110) to the battery while charging. And the "output of the battery" (123 and 124 in FIG. 1) is connected to the battery-powered device. However, in such designs, the battery powered device is a separate unit.

BRIEF SUMMARY OF THE INVENTION

It is an objective of the present invention to provide a power management and charger circuitry integrated into the battery powered apparatus. By integrating the charger unit, the power switch and the programmable current source to the micro-processor, the micro-processor can properly control the power supplied from the adaptor to the battery under the charging mode operation, which further deriving a smoother curve of charging current.

To achieve the above objective, the present invention provides a battery powered apparatus with the circuit of integrated power management and charger unit, comprising: a battery, an adaptor, a power management and charger unit, a battery powered device. The battery has a first terminal, and a second terminal, where the first terminal is used for receiving power and is provide power of the battery, and the second terminal is used for outputting a detected voltage of the battery ($V_{BAT}$). The battery is used for providing and receiving power. The adaptor has a terminal and is used for providing power. The power management and charger unit has a first terminal, a second terminal, a third terminal, a fourth terminal, a fifth terminal, a sixth terminal, a seventh terminal, an eighth terminal, and a ninth terminal, where the first terminal is electrically connected to the first terminal of the battery and is used for receiving power of the battery, the second terminal is electrically connected to the terminal of the adaptor and is used for receiving power of the adaptor, the third terminal is used for outputting power, the fourth terminal is electrically connected to the second terminal of the battery and used for receiving the detected voltage of the battery ($V_{BAT}$), the fifth terminal is used for outputting a digital signal (ADC_OUT), the sixth terminal is used for receiving a first control signal (S1<n1:0>), the seventh terminal is used for receiving a second control signal (S2<n2:0>), the eighth terminal is used for receiving a third control signal (I<n3:0>), and the ninth terminal is electrically connected to the first terminal of the battery and is used for outputting power to the battery. The battery powered device has a first terminal, a second terminal, a third terminal, a fourth terminal, and a fifth terminal, where the first terminal is electrically connected to the third terminal of the power management and charger unit and is used for receiving the power output from the power management and charger unit, the second terminal is electrically connected to the fifth terminal of the power management and charger unit and is used for receiving the digital signal (ADC_OUT) output from the power management and charger unit, the third terminal is electrically connected to the sixth terminal of the power management and charger unit and is used for outputting the first control signal S1<n1:0>, the fourth terminal is electrically connected to the seventh terminal of the power management and charger unit and is used for outputting the second control signal (S2<n2:0>), and the fifth terminal is electrically connected to the eighth terminal of the power management and charger unit and is used for outputting a third control signal (I<n3:0>), wherein the power management and charger unit is used for operation switching of battery mode and charging mode of the battery powered apparatus with the circuit of integrated power management and charger unit according the first control signal S1<n1:0>, the second control signal (S2<n2:0>) and the third control signal (I<n3:0>) output from the battery powered device.

According to one aspect of the present invention, the power management and charger unit and the battery powered device can be realized by using the 0.18 μm, 0.13 μm, 0.09 μm, 0.045 μm, 0.023 μm, 0.011 μm or the advanced process.

According to one aspect of the present invention, the battery can be selected from flow battery, lead-acid battery, lithium air battery, lithium-ion battery, lithium iron phosphate battery, lithium-sulfur battery, lithium-titanate battery, molten salt battery, nickel-cadmium battery, nickel hydrogen battery, nickel-iron battery, nickel metal hydride battery, nickel-zinc battery, organic radical battery, polymer-based battery, polysulfide bromide battery, rechargeable alkaline battery, sodium-sulfur battery, super iron battery, zinc-bromine flow battery and zinc matrix battery.

According to one aspect of the present invention, the battery powered device further comprising: a micro-processor controller, a block with other functions. The micro-processor controller has a first terminal, a second terminal, a third terminal, a fourth terminal, a fifth terminal, and a sixth terminal, where the first terminal is electrically connected to the first terminal of the battery powered device, the second terminal is electrically connected to the second terminal of the battery powered device, the third terminal is electrically connected to the third terminal of the battery powered device, the fourth terminal is electrically connected to the fourth terminal of the battery powered device, the fifth terminal is electrically connected to the fifth terminal of the battery powered device. The micro-processor controller is used for outputting the first control signal (S1<n1:0>), the second control signal (S2<n2:0>) and the third control signal (I<n3:0>). The block with other functions is electrically connected to the sixth terminal of the micro-processor controller.

According to one aspect of the present invention, the power management and charger unit further comprising: a power switch, a programmable current source, a regulator, an analog to digital converter. The power switch has a first terminal, a second terminal, a third terminal, and a fourth terminal, where the first terminal is electrically connected to the first terminal of the power management and charger unit, the second terminal is electrically connected to the second terminal of the power management and charger unit, the third terminal is used for outputting power, and the fourth terminal is electrically connected to the sixth terminal of the power management and charger unit. The programmable current source has a first terminal, a second terminal, a third terminal, a fourth terminal, and a fifth terminal, the first terminal is electrically connected to the second terminal of the power management and charger unit, the second terminal is electrically connected to the ninth terminal of the power management and charger unit, the third terminal is used for outputting a detected voltage of the adaptor ($V_{ADT}$), the fourth terminal is electrically connected to the eighth terminal of the power management and charger unit, and the fifth is electrically connected to the seventh terminal of the power management and charger unit. The regulator has a first terminal and a second terminal for providing power, the first terminal is electrically connected to the third terminal of the power switch, the second terminal is electrically connected to the third terminal of the power management and charger unit. The analog to digital converter has a first terminal, a second terminal, a third terminal, and fourth terminal, the first terminal is electrically connected to the fourth terminal of the power management and charger unit, the second terminal is electrically connected to the third terminal of the programmable current source, the third terminal is electrically connected to the fifth terminal of the power management and charger unit, and the fourth terminal is electrically connected to the second terminal of the regulator.

According to one aspect of the present invention, the power switch further comprising: a comparator, a power p-type MOS, a plurality of pairs of diodes and switches with series connection, an external diode. The comparator has a first terminal, a second terminal, a third terminal, a fourth terminal, and a ground terminal, where the first terminal is electrically connected to the first terminal of the power switch, the second terminal is electrically connected to the second terminal of the power switch, the third terminal used for receiving a voltage signal ($V_{sys}$) and the fourth terminal and is used for the outputting a output voltage (Vout) of the comparator. The power p-type MOS has a gate terminal, a source terminal and a drain terminal, the source terminal is electrically connected to the first terminal of the power switch. The plurality of pairs of diodes and switches with series connection has a first terminal and a second terminal, the first terminal of the plurality of pairs of diodes and switches with series connection is electrically connected to the first terminal of the power switch. The external diode has a first terminal and a second terminal, the first terminal is electrically connected to the second terminal of the plurality of pairs of diodes and switches with series connection. The power p-type MOS is used for outputting a voltage signal ($V_{sys}$) wherein the drain terminal of the power p-type MOS and the second terminal of the external diode are electrically connected to the third terminal of the comparator. The plurality of pairs of diodes and switches with series connection are turned on according to the first control signal (S1<n1:0>) of the power switch. The power p-type MOS is controlled by the voltage signal ($V_{sys}$) of the external diode, wherein the drain terminal of the power p-type MOS and the second terminal of the external diode are electrically connected to the third terminal of the comparator. The plurality of pairs of diodes and switches with series connection are turned on according to the first control signal (S1<n1:0>) of the power switch. The power p-type MOS is controlled by the voltage signal ($V_{sys}$) of the external diode.

According to one aspect of the present invention, the plurality of switches can be replaced and selected from Bipolar Junction Transistor (BJT), Heterojunction Bipolar Transistor (HBT), High Electronic Mobility Transistor (HEMT), Pseudomorphic HEMT (PHEMT), Complementary Metal Oxide Semiconductor Filed Effect Transistor (CMOS) and Laterally Diffused Metal Oxide Semiconductor Filed Effect Transistor (LDMOS).

According to one aspect of the present invention, the turned on number of the plurality of pairs of diodes and switches with series connection is determined by the output terminal of first control signal (S1<n1:0>) of the micro-processor controller.

The battery powered apparatus as claimed in claim 6, wherein the voltage signal ($V_{sys}$) of the external diode is equal to $V_{ADA}-0.7$ k, where k is the turned on number of the plurality of pairs of diodes and switches with series connection.

These and many other advantages and features of the present invention will be readily apparent to those skilled in the art from the following drawings and detailed descriptions.

BRIEF DESCRIPTION OF THE DRAWINGS

All the objects, advantages, and novel features of the invention will become more apparent from the following detailed descriptions when taken in conjunction with the accompanying drawings.

DETAILED DESCRIPTION OF THE INVENTION

Although the invention has been explained in relation to several preferred embodiments, the accompanying drawings and the following detailed descriptions are the preferred embodiment of the present invention. It is to be understood that the following disclosed descriptions will be examples of present invention, and will not limit the present invention into the drawings and the special embodiment.

Figure 1:
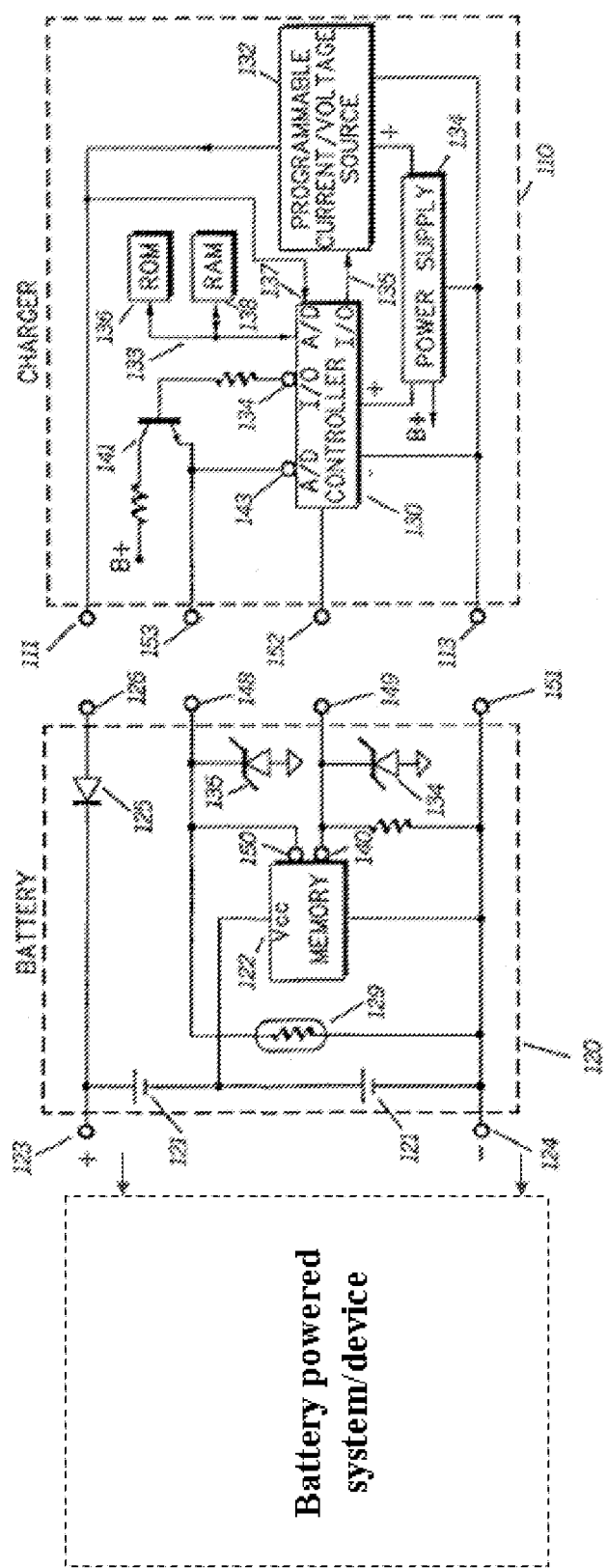
FIG. 1 shows a schematic of the functional block diagram of the prior art.
Figure 2:
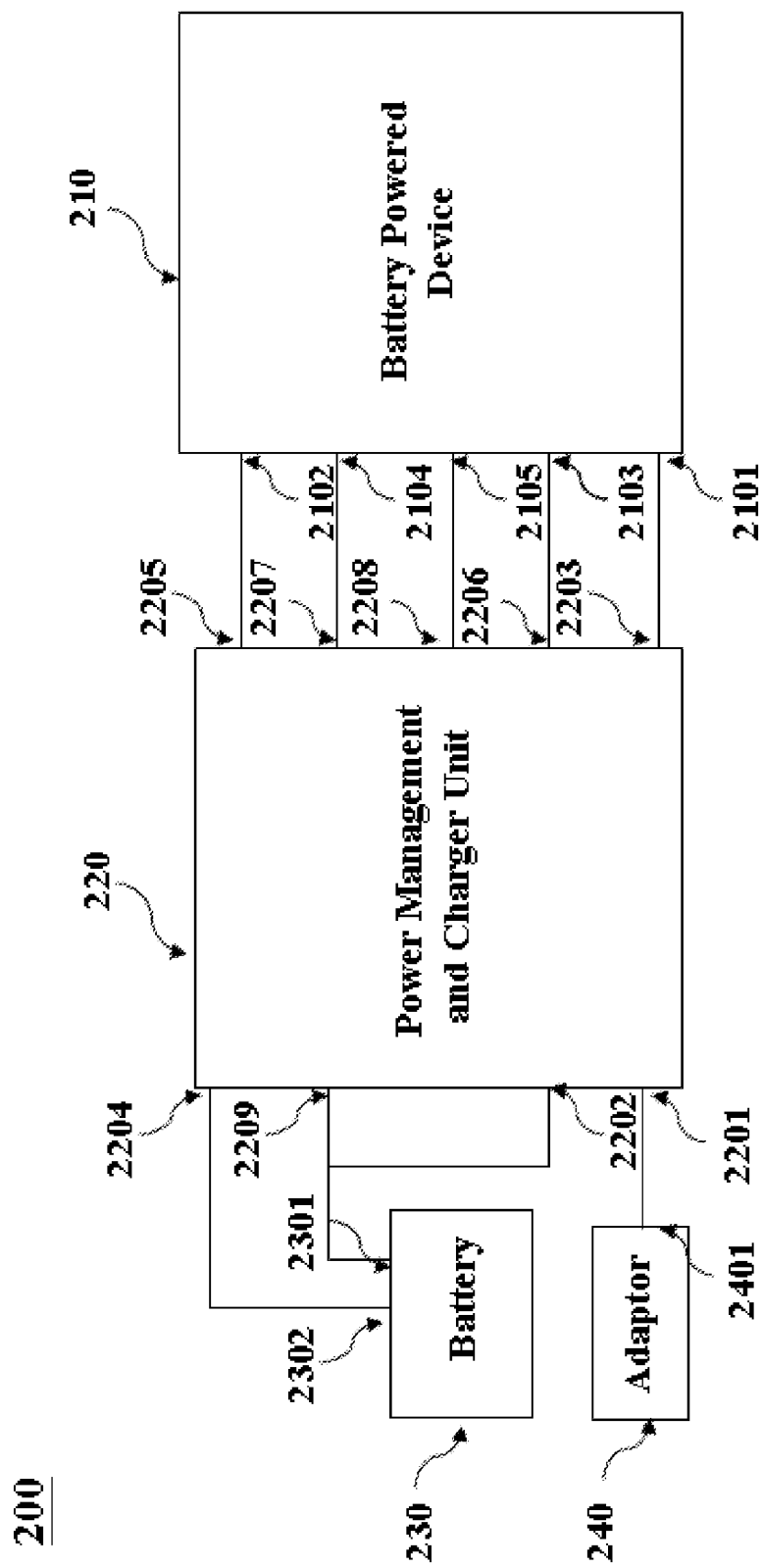
FIG. 2 shows a schematic of the functional block diagram of the battery powered apparatus with the circuit of integrated power management and charger unit 200 of the present invention.

To understand the spirit of the present invention, please referring to FIG. 2, it shows the schematic of the functional block diagram of a battery powered apparatus with the circuit of integrated power management and charger unit 200 of the present invention, wherein the apparatus 200 comprises: a battery 230, an adaptor 240, a power management and charger unit 220, and a battery powered device 210.

The battery 230 has a first terminal 2301, and a second terminal 2302, where the first terminal 2301 is used for receiving power and is provide power of the battery 230, and the second terminal 2302 is used for outputting a detected voltage of the battery ($V_{BAT}$) 241. The battery 230 is used for providing and receiving power. The adaptor 240 has a terminal 2401 and is used for providing power. The power management and charger unit 220 has a first terminal 2201, a second terminal 2202, a third terminal 2203, a fourth terminal 2204, a fifth terminal 2205, a sixth terminal 2206, a seventh terminal 2207, an eighth terminal 2008, and a ninth terminal 2209, where the first terminal 2201 is electrically connected to the first terminal 2301 of the battery and is used for receiving power of the battery 230, the second terminal 2202 is electrically connected to the terminal of the adaptor 2401 and is used for receiving power of the adaptor 240, the third terminal 2203 is used for outputting power, the fourth terminal 2204 is electrically connected to the second terminal 2302 of the battery 230 and used for receiving the detected voltage of the battery ($V_{BAT}$) 241, the fifth terminal 2205 is used for outputting a digital signal (ADC_OUT) 243, the sixth terminal 2206 is used for receiving a first control signal (S1<n1:0>) 246, the seventh terminal 2207 is used for receiving a second control signal (S2<n2:0>) 244, the eighth terminal 2208 is used for receiving a third control signal (I<n3:0>) 245, and the ninth terminal 2209 is electrically connected to the first terminal 2301 of the battery 230 and is used for outputting power to the battery 230. The battery powered device 210 has a first terminal 2101, a second terminal 2102, a third terminal 2103, a fourth terminal 2104, and a fifth terminal 2105, where the first terminal 2101 is electrically connected to the third terminal 2202 of the power management and charger unit 220 and is used for receiving the power output from the power management and charger unit 220, the second terminal 2102 is electrically connected to the fifth terminal 2205 of the power management and charger unit 220 and is used for receiving the digital signal (ADC_OUT) 243 output from the power management and charger unit 220, the third terminal 2103 is electrically connected to the sixth terminal 2206 of the power management and charger unit 220 and is used for outputting the first control signal S1<n1:0> 246, the fourth terminal 2104 is electrically connected to the seventh terminal 2207 of the power management and charger unit 220 and is used for outputting the second control signal (S2<n2:0>) 244, and the fifth terminal 2105 is electrically connected to the eighth terminal 2208 of the power management and charger unit 220 and is used for outputting a third control signal (I<n3:0>) 245, wherein the power management and charger unit 220 is used for operation switching of battery mode and charging mode of the battery powered apparatus with the circuit of integrated power management and charger unit 200 according the first control signal S1<n1:0> 246, the second control signal (S2<n2:0>) 244 and the third control signal (I<n3:0>) 245 output from the battery powered device 210.

It should be note that the power management and charger unit 220 and the battery powered device 210 can be realized by using the 0.18 μm, 0.13 μm, 0.09 μm, 0.045 μm, 0.023 μm, 0.011 μm or the advanced process. The battery 230 can be selected from flow battery, lead-acid battery, lithium air battery, lithium-ion battery, lithium iron phosphate battery, lithium-sulfur battery, lithium-titanate battery, molten salt battery, nickel-cadmium battery, nickel hydrogen battery, nickel-iron battery, nickel metal hydride battery, nickel-zinc battery, organic radical battery, polymer-based battery, polysulfide bromide battery, rechargeable alkaline battery, sodium-sulfur battery, super iron battery, zinc-bromine flow battery and zinc matrix battery.

Figure 3:
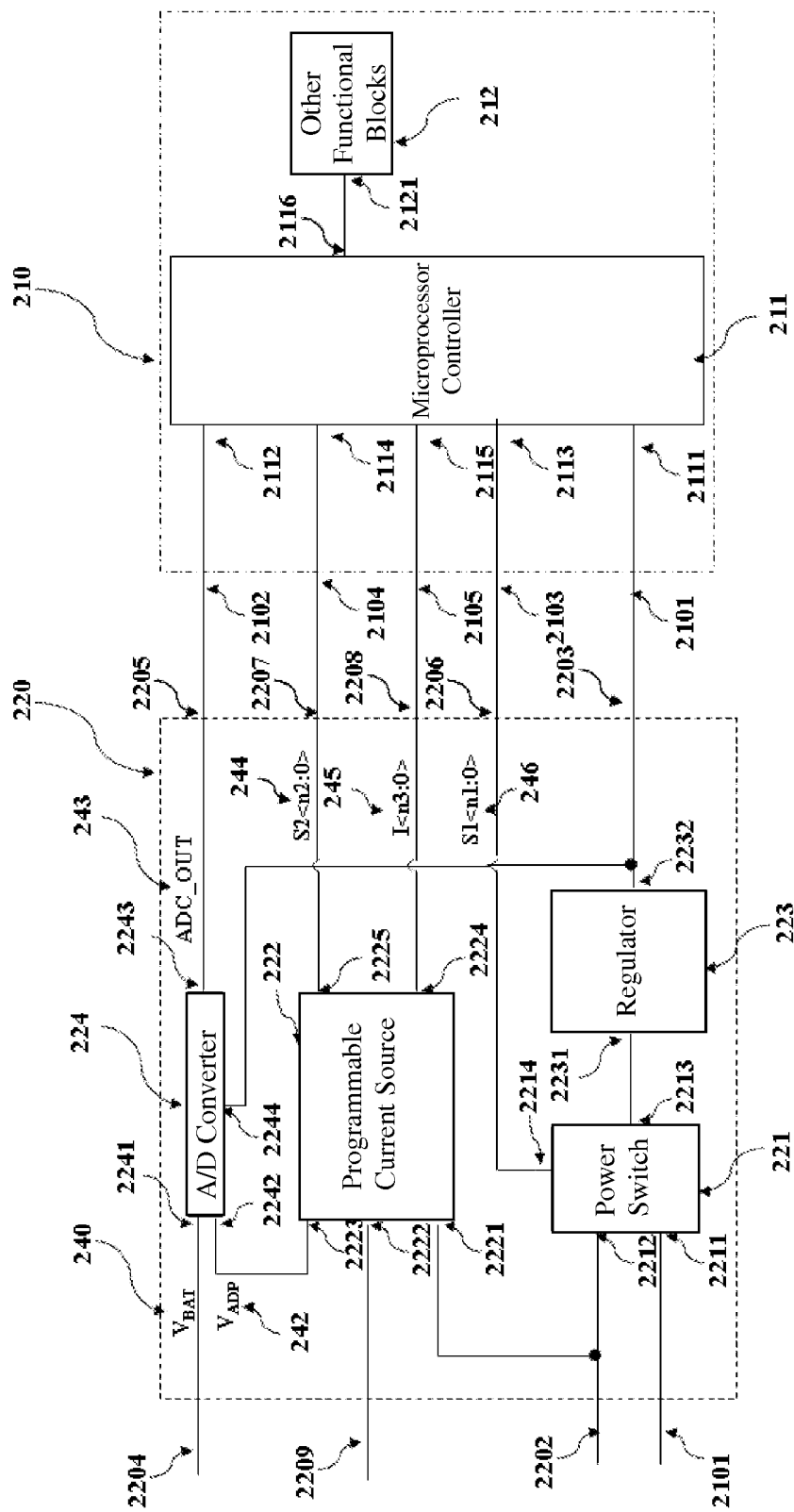
FIG. 3 shows a schematic of the component of the functional block diagram of battery powered device and the power management and charger unit.

Now please refer to FIG. 3, the battery powered device 210 further comprising: a micro-processor controller 211, a block with other functions 212. The micro-processor controller 211 has a first terminal 2111, a second terminal 2112, a third terminal 2113, a fourth terminal 2114, a fifth terminal 2115, and a sixth terminal 2116, where the first terminal 2111 is electrically connected to the first terminal 2101 of the battery powered device 210, the second terminal 2112 is electrically connected to the second terminal 2102 of the battery powered device 210, the third terminal 2113 is electrically connected to the third terminal 2103 of the battery powered device 210, the fourth terminal 2114 is electrically connected to the fourth terminal 2104 of the battery powered device 210, the fifth terminal 2115 is electrically connected to the fifth terminal 2105 of the battery powered device. The micro-processor controller 211 is used for outputting the first control signal (S1<n1:0>) 246, the second control signal (S2<n2:0>) 244 and the third control signal (I<n3:0>) 245. The block with other functions 212 is electrically connected to the sixth terminal 2116 of the micro-processor controller 211.

Moreover, The power management and charger unit 220 further comprising: a power switch 221, a programmable current source 222, a regulator 223, an analog to digital converter 224. The power switch 221 has a first terminal 2211, a second terminal 2212, a third terminal 2213, and a fourth terminal 2214, where the first terminal 2211 is electrically connected to the first terminal 2201 of the power management and charger unit 220, the second terminal 2212 is electrically connected to the second terminal 2202 of the power management and charger unit 220, the third terminal 2213 is used for outputting power, and the fourth 2214 terminal is electrically connected to the sixth 2206 terminal of the power management and charger unit 220. The programmable current source 222 has a first terminal 2221, a second terminal 2222, a third terminal 2223, a fourth terminal 2224, and a fifth terminal 2225, the first terminal 2221 is electrically connected to the second terminal 2202 of the power management and charger unit 220, the second terminal 2222 is electrically connected to the ninth terminal 2209 of the power management and charger unit 220, the third terminal 2203 is used for outputting a detected voltage of the adaptor ($V_{ADT}$) 242, the fourth terminal 2224 is electrically connected to the eighth terminal 2208 of the power management and charger unit 220, and the fifth 2225 is electrically connected to the seventh terminal 2207 of the power management and charger unit 220. The regulator 223 has a first terminal 2231 and a second terminal 2232 for providing power, the first terminal 2231 is electrically connected to the third terminal 2213 of the power switch, the second terminal 2232 is electrically connected to the third terminal 2203 of the power management and charger unit 220. The analog to digital converter 224 has a first terminal 2241, a second terminal 2242, a third terminal 2243, and fourth terminal 2244, the first terminal 2241 is electrically connected to the fourth terminal 2204 of the power management and charger unit 220, the second terminal 2242 is electrically connected to the third terminal 2223 of the programmable current source 222, the third terminal 2243 is electrically connected to the fifth terminal 2205 of the power management and charger unit 220, and the fourth terminal 2244 is electrically connected to the second terminal 2232 of the regulator 223.

Figure 4:
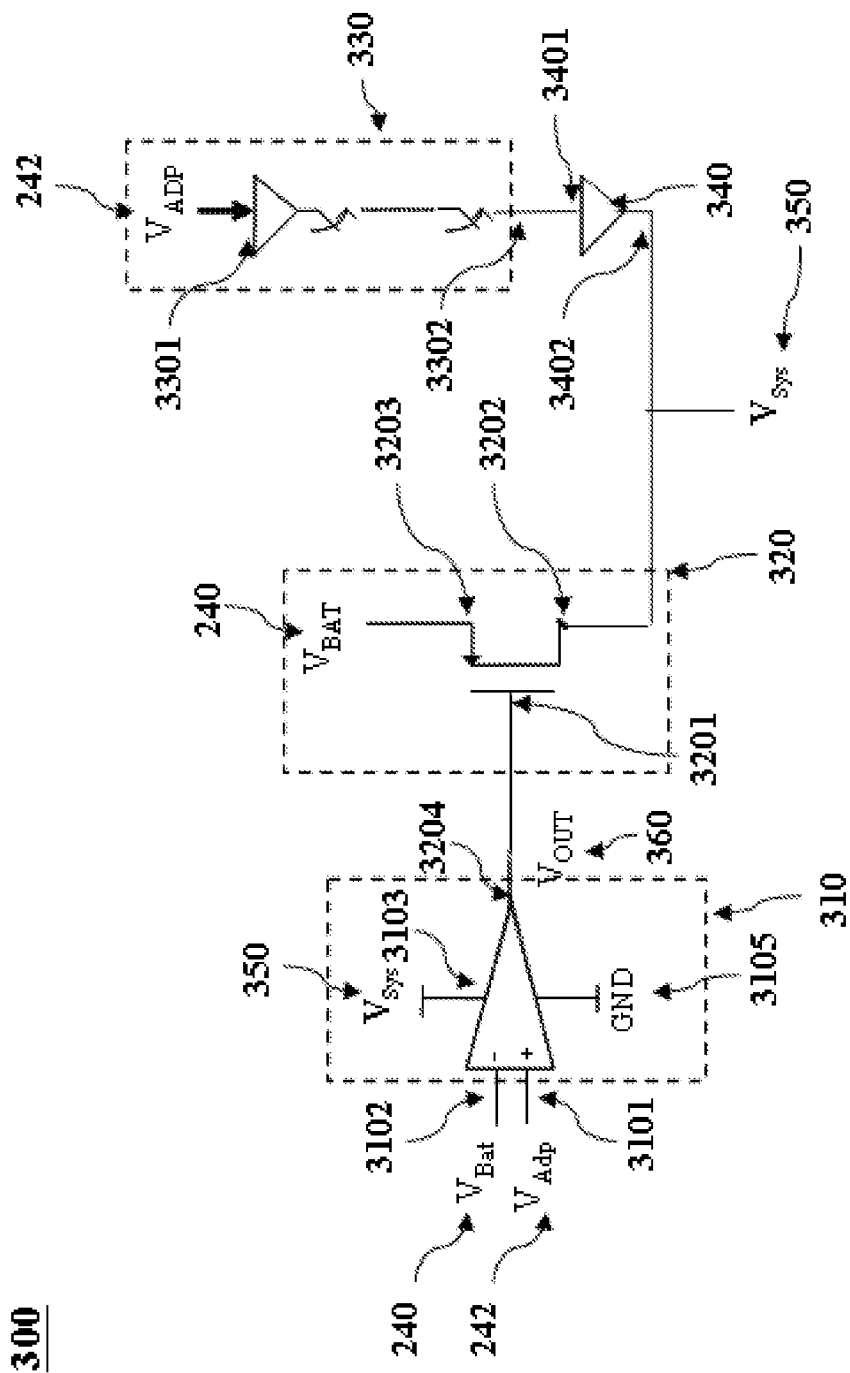
FIG. 4 shows a schematic of the circuit of the power switch of the present invention.

Now please refer to FIG. 4, it shows the schematic of the circuit of the power switch 221 of the present invention, where the power switch 221 further comprising: a comparator 310, a power p-type MOS 320, a plurality of pairs of diodes and switches with series connection 330, an external diode 340.

The comparator 310 has a first terminal 3101, a second terminal 3102, a third terminal 3103, a fourth terminal 3104, and a ground terminal 3105, where the first terminal 3101 is electrically connected to the first terminal 2211 of the power switch 221, the second terminal 3102 is electrically connected to the second terminal 2212 of the power switch 221, the third terminal 3103 used for receiving a voltage signal ($V_{sys}$) 350 and the a fourth terminal 3104 and is used for the outputting a output voltage ($V_{out}$) 360 of the comparator 310. The power p-type MOS 320 has a gate terminal 3201, a source terminal 3202 and a drain terminal 3203, the source terminal 3202 is electrically connected to the first terminal 2211 of the power switch 221. The plurality of pairs of diodes and switches with series connection 330 has a first terminal 3301 and a second terminal 3302, the first terminal 3301 of the plurality of pairs of diodes and switches with series connection 330 is electrically connected to the first terminal 2211 of the power switch 221. The external diode 340 has a first terminal 3401 and a second terminal 3402, the first terminal 3401 is electrically connected to the second terminal 3302 of the plurality of pairs of diodes and switches with series connection 330. The power p-type MOS 320 is used for outputting a voltage signal ($V_{sys}$) 350 wherein the drain terminal 3203 of the power p-type MOS 320 and the second terminal 3402 of the external diode 340 are electrically connected to the third terminal 3103 of the comparator 310. The plurality of pairs of diodes and switches with series connection 330 are turned on according to the first control signal (S1<n1:0>) 246 of the power switch 221. The power p-type MOS 320 is controlled by the voltage signal ($V_{sys}$) 350 of the external diode 340, wherein the drain terminal 3203 of the power p-type MOS 320 and the second terminal 3402 of the external diode 340 are electrically connected to the third terminal 3103 of the comparator 310. The plurality of pairs of diodes and switches with series connection 330 are turned on according to the first control signal (S1<n1:0>) 246 of the power switch 221. The power p-type MOS 320 is controlled by the voltage signal ($V_{sys}$) 350 of the external diode 340.

It should be noted that the plurality of pairs of diodes and switches with series connection 330 and the external diode 340 can be replaced by a regulator. The plurality of pairs of diodes and switches with series connection 330 can be replaced and selected from Bipolar Junction Transistor (BJT), Heterojunction Bipolar Transistor (HBT), High Electronic Mobility Transistor (HEMT), Pseudomorphic HEMT (PHEMT), Complementary Metal Oxide Semiconductor Filed Effect Transistor (CMOS) and Laterally Diffused Metal Oxide Semiconductor Filed Effect Transistor (LDMOS). The number of the plurality of pairs of diodes and switches with series connection 330 is determined by the output terminal of control signal of S1<n1:0> of the micro-processor controller 211.

Figure 5:
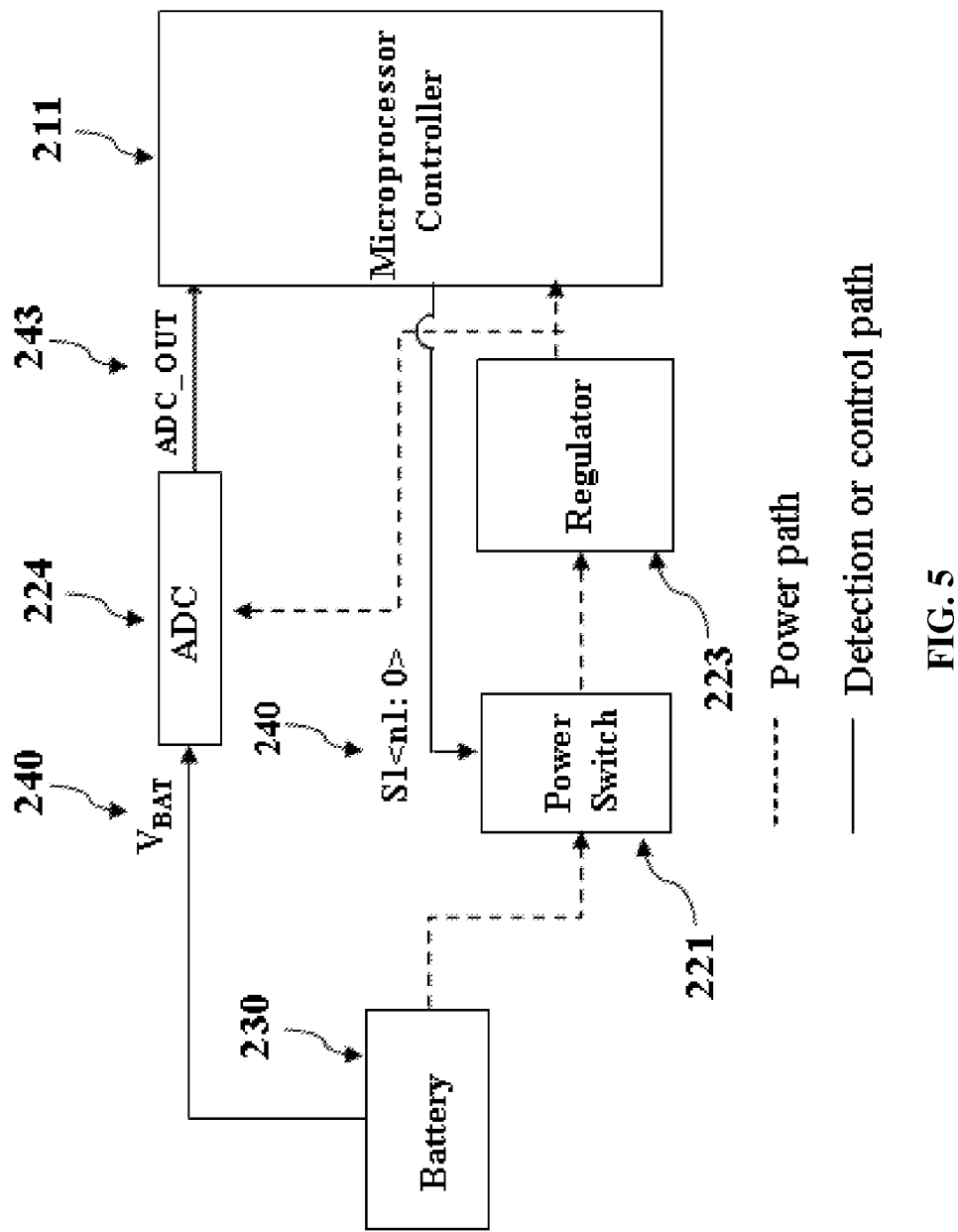
FIG. 5 shows a schematic of the operation of battery mode of the battery powered apparatus with the circuit of integrated power management and charger unit 200 of the present invention.

To better understand the spirit of the present invention, please refer to FIG. 5, and the FIG. 4 again, FIG. 5 shows a schematic of the operation of battery mode of the battery powered apparatus with the circuit of integrated power management and charger unit 200 of the present invention. In battery mode operation, the adaptor 240 is not connected to the power management and charger unit 220 and the output terminal of the comparator 310 is equal to 0. With 0 volt as input, the power p-type MOS 320 is turned on and its output $V_{sys}$ 350 is equal to its input voltage $V_{BAT}$ 241. In the meantime, because the input voltage $V_{ADP}$ 242 to plurality of pairs of diodes and switches with series connection 330 is 0 under battery mode operation, the plurality of diodes will not be turned on, that is, the microprocessor controller 211 is essentially disable and we have $V_{sys}$ 350=$V_{BAT}$ 242.

Figure 6:
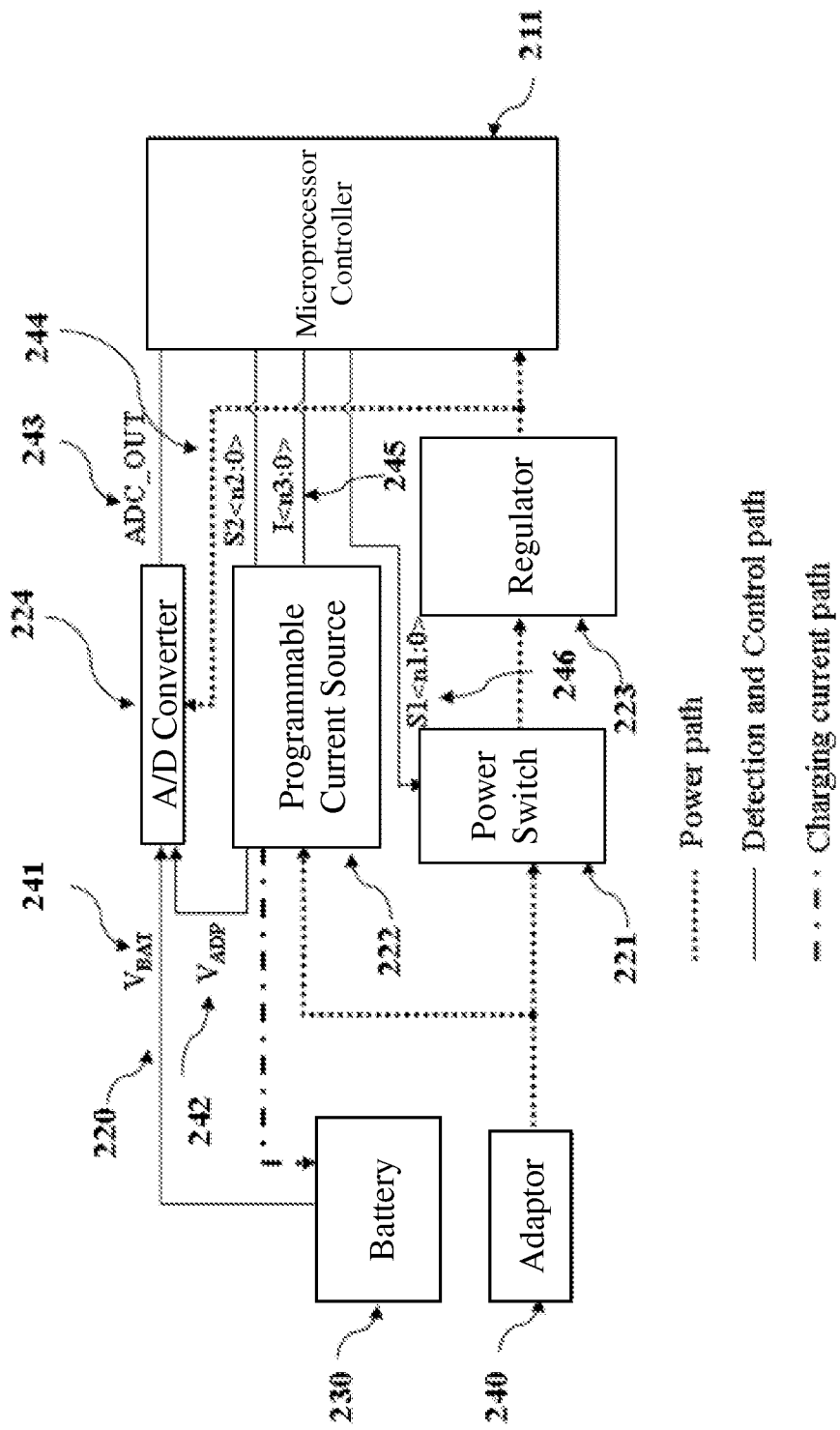
FIG. 6 shows a schematic of the battery mode operation of the battery powered apparatus with the circuit of integrated power management and charger unit 200 of the present invention.

Now please refer to FIG. 6, it shows a schematic of the battery mode operation of the battery powered apparatus with the circuit of integrated power management and charger unit 200 of the present invention. In the charging mode operation, the adaptor 240 is connected the power management and charger unit 220, and $V_{ADA}$ 242 is greater than $V_{BAT}$ 241 Therefore, the fourth terminal 3104 of comparator 310 is equal to $V_{sys}$ 350. With $V_{sys}$ 350 as input, the power p-type MOS 320 is now turned off and $V_{sys}$ 350 is controlled by the second terminal 3402 of the external diode 340. With the adaptor connection, the plurality of pairs of diodes and switches with series connection 330 gets an input voltage which ranges from 3.8 to 5.7 volt. Therefore the diodes 340 will be turned on and each diode will have an output voltage about 0.7 volt below its input voltage. In case k pairs of diodes/switches are turned on, the output voltage of the second terminal 3402 of the external diode 340 will be equal to $V_{ADA}$–0.7 k volt. It should be note that the turned on number of the plurality of pairs of diodes and switches with series connection 330 is determined by the first signal of S1<n1:0> 246 of the micro-processor controller 211.

During the charging mode operation, namely, the adaptor 240 is plugged in, the digital signal (ADC_OUT) 243 can be used for the micro-processor controller 211 to determine the status of the battery 230 (under-charged, charging, close to be fully charged, fully charged, etc.), which can properly control the programmable current source 222 over the charging process.

The turned on number of the plurality of pairs of diodes and switches with series connection 330 is determined by the output terminal of first control signal (S1<n1:0>) 246 of the micro-processor controller 211. The voltage signal ($V_{sys}$) 350 of the external diode 340 is equal to $V_{ADA}$–0.7 k, where k is the turned on number of the plurality of pairs of diodes and switches with series connection 330.

Figure 7:
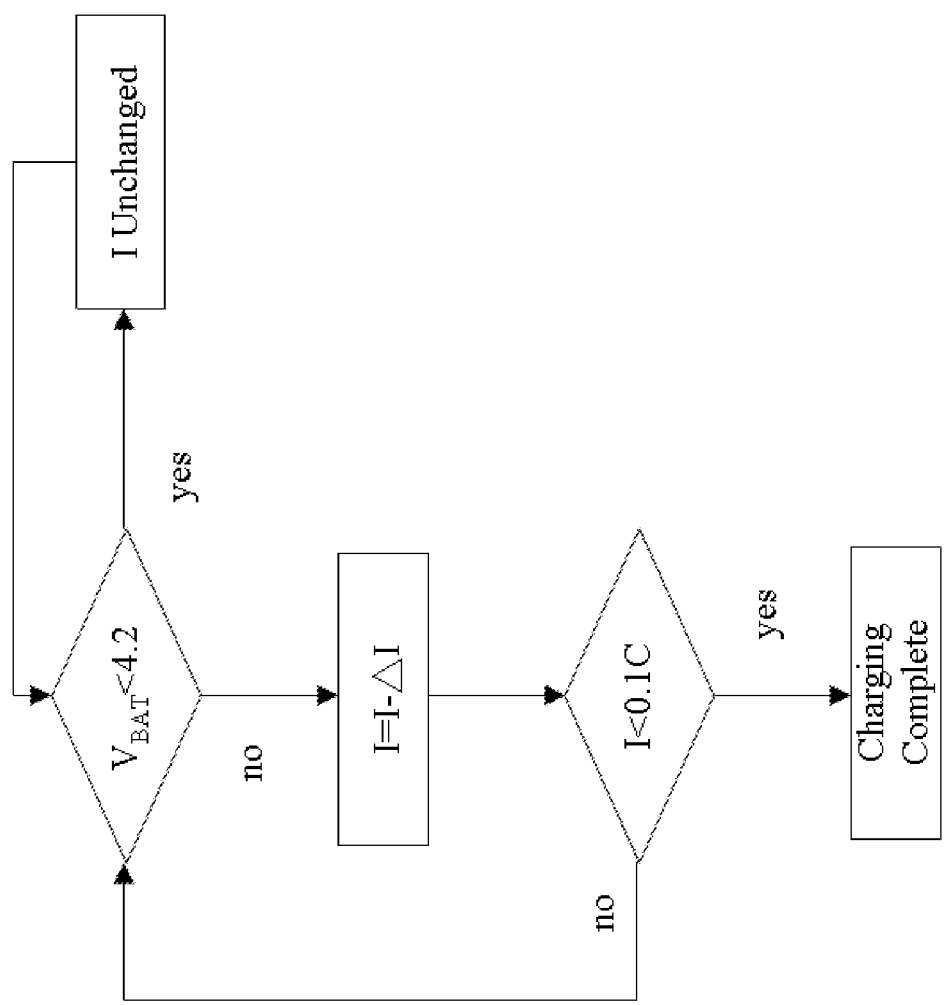
FIG. 7 shows a schematic of state machine for charger current control of the present invention.
Figure 8:
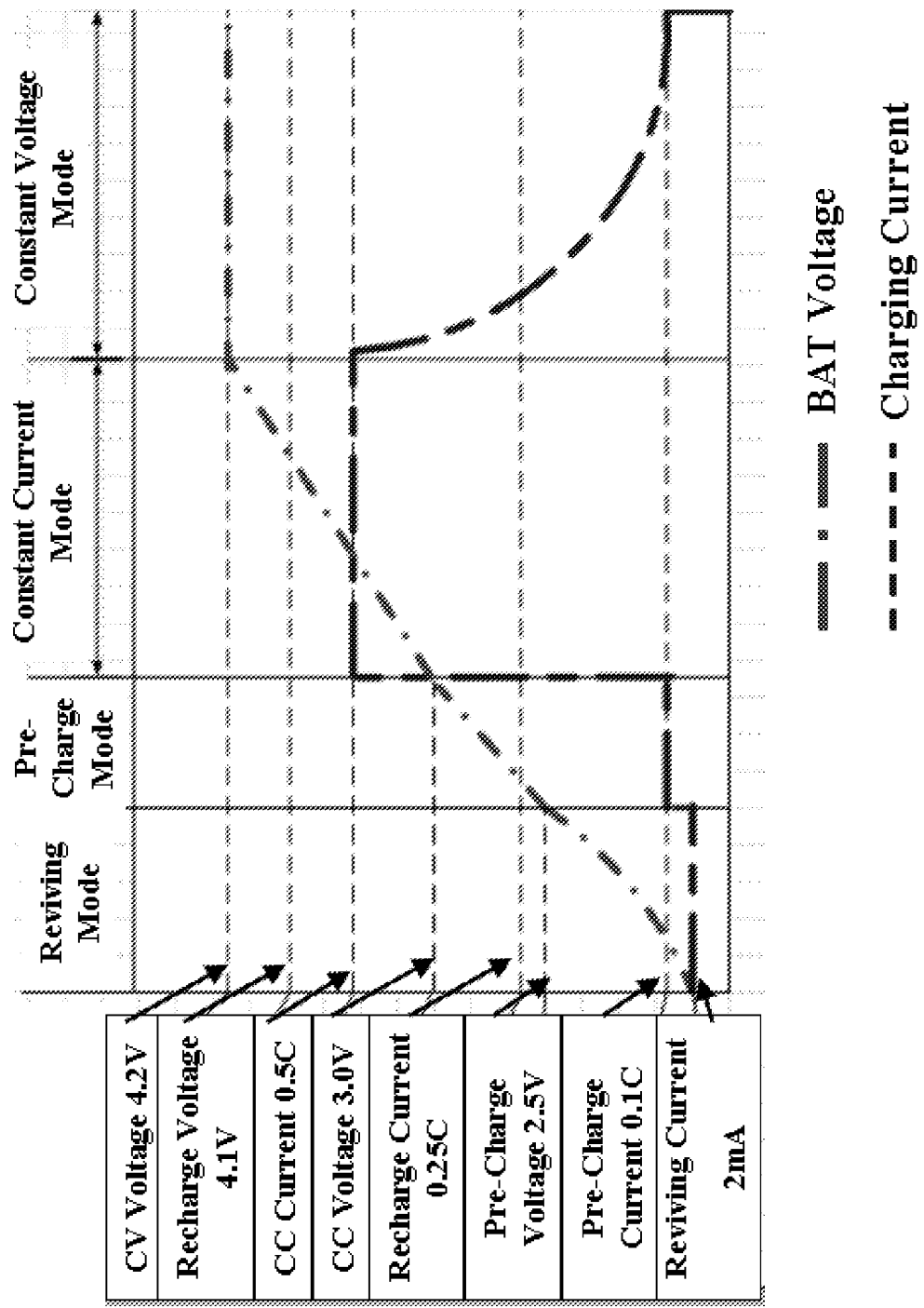
FIG. 8 shows a schematic of the computer simulated results: charging current and battery voltage of the present invention.
Figure 9:
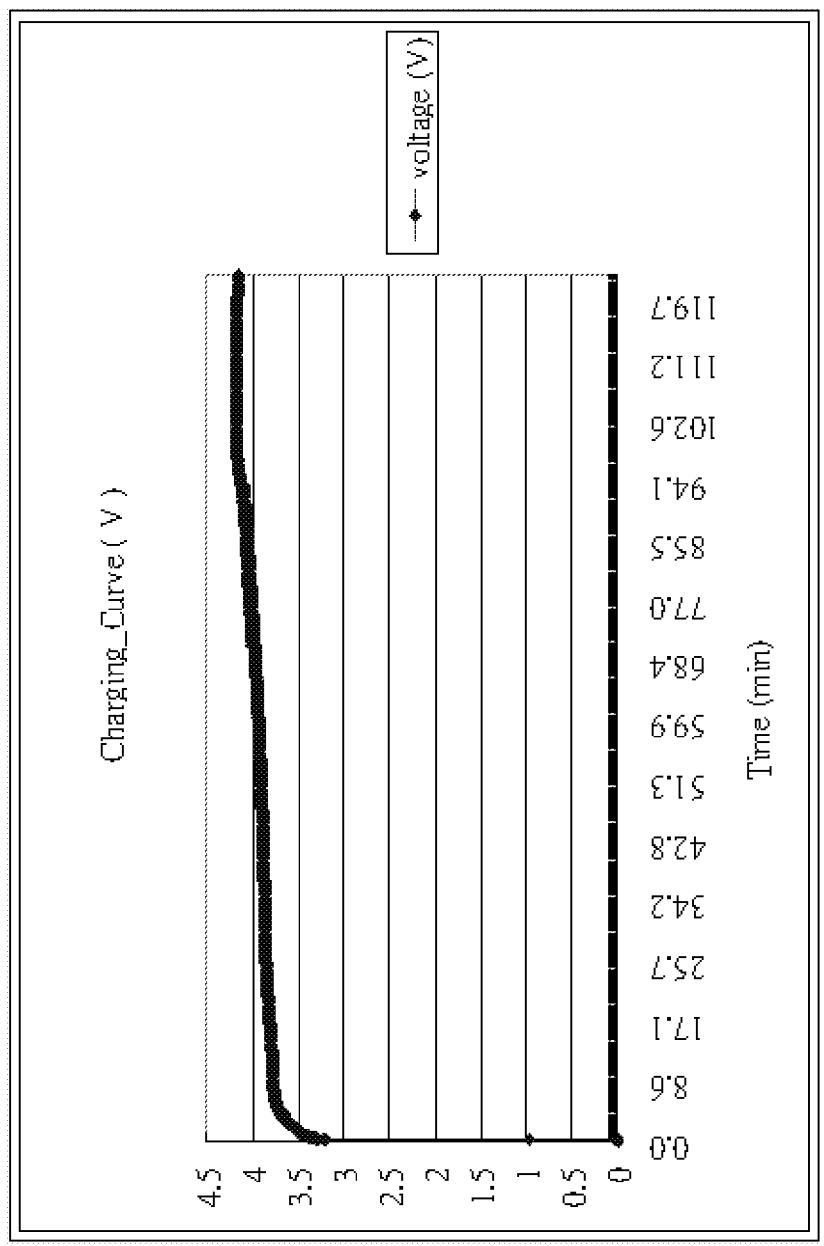
FIG. 9 shows a schematic of the measured charging current and battery voltage of the present invention.

FIG. 7 shows a schematic of state machine for charger current control of the present invention; FIG. 8 shows a schematic of the computer simulated results: charging current and battery voltage of the present invention; and FIG. 9 shows a schematic of the measured charging current and battery voltage of the present invention.

The functions and the advantages of the present invention have been shown. Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A battery powered apparatus with the circuit of integrated power management and charger unit, comprising:
   a battery, having a first terminal and a second terminal, the first terminal used for receiving power and provide power of the battery and the second terminal used for outputting a detected voltage of the battery ($V_{BAT}$), the battery used for providing and receiving power;

an adaptor, having a terminal, used for providing power;
a power management and charger unit, having a first terminal, a second terminal, a third terminal, a fourth terminal, a fifth terminal, a sixth terminal, a seventh terminal, an eighth terminal and a ninth terminal, the first terminal electrically connected to the first terminal of the battery and used for receiving power of the battery, the second terminal electrically connected to the terminal of the adaptor and used for receiving power of the adaptor, the third terminal used for outputting power, the fourth terminal electrically connected to the second terminal of the battery and used for receiving the detected voltage of the battery ($V_{BAT}$), the fifth terminal used for outputting a digital signal (ADC_OUT), the sixth terminal used for receiving a first control signal (S1<n1:0>), the seventh terminal used for receiving a second control signal (S2<n2:0>), the eighth terminal used for receiving a third control signal (I<n3:0>), and the ninth terminal electrically connected to the first terminal of the battery and used for outputting power to the battery;
a battery powered device, having a first terminal, a second terminal, a third terminal, a fourth terminal and a fifth terminal, the first terminal electrically connected to the third terminal of the power management and charger unit and used for receiving the power output from the power management and charger unit, the second terminal electrically connected to the fifth terminal of the power management and charger unit and used for receiving the digital signal (ADC_OUT) output from the power management and charger unit, the third terminal electrically connected to the sixth terminal of the power management and charger unit and used for outputting the first control signal (S1<n1:0>), the fourth terminal electrically connected to the seventh terminal of the power management and charger unit and used for outputting the second control signal (S2<n2:0>), and the fifth terminal electrically connected to the eighth terminal of the power management and charger unit and used for outputting a third control signal (I<n3:0>); and
wherein the power management and charger unit is used for operation switching of battery mode and charging mode of the battery powered apparatus with the circuit of integrated power management and charger unit according the first control signal (S1<n1:0>), the second control signal (S2<n2:0>) and the third control signal (I<n3:0>) output from the battery powered device.

2. The battery powered apparatus as claimed in claim 1, wherein the power management and charger unit and the battery powered device can be realized by using the 0.18 µm, 0.13 µm, 0.09 µm, 0.045 µm, 0.023 µm, 0.011 µm or the advanced process.

3. The battery powered apparatus as claimed in claim 1, wherein the battery can be selected from flow battery, lead-acid battery, lithium air battery, lithium-ion battery, lithium iron phosphate battery, lithium-sulfur battery, lithium-titanate battery, molten salt battery, nickel-cadmium battery, nickel hydrogen battery, nickel-iron battery, nickel metal hydride battery, nickel-zinc battery, organic radical battery, polymer-based battery, polysulfide bromide battery, rechargeable alkaline battery, sodium-sulfur battery, super iron battery, zinc-bromine flow battery and zinc matrix battery.

4. The battery powered apparatus as claimed in claim 1, wherein the battery powered device further comprising:
a micro-processor controller, having a first terminal, a second terminal, a third terminal, a fourth terminal, a fifth terminal and a sixth terminal, the first terminal electrically connected to the first terminal of the battery powered device, the second terminal electrically connected to the second terminal of the battery powered device, the third terminal electrically connected to the third terminal of the battery powered device, the fourth terminal electrically connected to the fourth terminal of the battery powered device, the fifth terminal electrically connected to the fifth terminal of the battery powered device, used for outputting the first control signal (S1<n1:0>), the second control signal (S2<n2:0>) and the third control signal (I<n3:0>); and
a block with other functions, electrically connected to the sixth terminal of the micro-processor controller.

5. The battery powered apparatus as claimed in claim 1, wherein the power management and charger unit further comprising:
a power switch, having a first terminal, a second terminal, a third terminal and a fourth terminal, the first terminal electrically connected to the first terminal of the power management and charger unit, the second terminal electrically connected to the second terminal of the power management and charger unit, the third terminal used for outputting power, and the fourth terminal electrically connected to the sixth terminal of the power management and charger unit;
a programmable current source, having a first terminal, a second terminal, a third terminal, a fourth terminal, and a fifth terminal, the first terminal electrically connected to the second terminal of the power management and charger unit, the second terminal electrically connected to the ninth terminal of the power management and charger unit, the third terminal used for outputting a detected voltage of the adaptor ($V_{ADT}$), the fourth terminal electrically connected to the eighth terminal of the power management and charger unit, and the fifth electrically connected to the seventh terminal of the power management and charger unit;
a regulator, having a first terminal and a second terminal for providing power, the first terminal electrically connected to the third terminal of the power switch, the second terminal electrically connected to the third terminal of the power management and charger unit; and
an analog to digital converter, having a first terminal, a second terminal, a third terminal, and fourth terminal, the first terminal electrically connected to the fourth terminal of the power management and charger unit, the second terminal electrically connected to the third terminal of the programmable current source, the third terminal electrically connected to the fifth terminal of the power management and charger unit, and the fourth terminal electrically connected to the second terminal of the regulator.

6. The battery powered apparatus as claimed in claim 4, wherein the power switch further comprising:
a comparator, having a first terminal, a second terminal, a third terminal, a fourth terminal, and a ground terminal, the first terminal electrically connected to the first terminal of the power switch, the second terminal electrically connected to the second terminal of the power switch, the third terminal used for receiving a voltage signal ($V_{sys}$) and the a fourth terminal used for the outputting a output voltage (Vout) of the comparator;
a power p-type MOS, having a gate terminal, a source terminal and a drain terminal, the source terminal electrically connected to the first terminal of the power switch;

a plurality of pairs of diodes and switches with series connection, having a first terminal and a second terminal, the first terminal of the plurality of pairs of diodes and switches with series connection electrically connected to the first terminal of the power switch;

an external diode, having a first terminal and a second terminal, the first terminal electrically connected to the second terminal of the plurality of pairs of diodes and switches with series connection, used for outputting a voltage signal ($V_{sys}$); and wherein the drain terminal of the power p-type MOS and the second terminal of the external diode are electrically connected to the third terminal of the comparator. The plurality of pairs of diodes and switches with series connection are turned on according to the first control signal (S1<n1:0>) of the power switch. The power p-type MOS is controlled by the voltage signal ($V_{sys}$) of the external diode.

7. The battery powered apparatus as claimed in claim 5, wherein the plurality of switches can be replaced and selected from Bipolar Junction Transistor (BJT), Heterojunction Bipolar Transistor (HBT), High Electronic Mobility Transistor (HEMT), Pseudomorphic HEMT (PHEMT), Complementary Metal Oxide Semiconductor Field Effect Transistor (CMOS) and Laterally Diffused Metal Oxide Semiconductor Field Effect Transistor (LDMOS).

8. The battery powered apparatus as claimed in claim 6, wherein the turned on number of the plurality of pairs of diodes and switches with series connection is determined by the output terminal of first control signal (S1<n1:0>) of the micro-processor controller.

9. The battery powered apparatus as claimed in claim 6, wherein the voltage signal ($V_{sys}$) of the external diode is equal to $V_{ADP}-0.7$ k, where k is the turned on number of the plurality of pairs of diodes and switches with series connection.

* * * * *